US012344521B2

(12) United States Patent
Reddy et al.

(10) Patent No.: US 12,344,521 B2
(45) Date of Patent: Jul. 1, 2025

(54) AUTOFILL PITCHER WITH ALTERNATE DISPENSING FEATURE

(71) Applicant: Haier US Appliance Solutions, Inc., Wilmington, DE (US)

(72) Inventors: Lokesha Kodigenahalli Chinnappa Reddy, Louisville, KY (US); Jason Andrew May, Anchorage, KY (US); Jarvis Ward, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 140 days.

(21) Appl. No.: 18/295,960

(22) Filed: Apr. 5, 2023

(65) Prior Publication Data

US 2024/0336472 A1 Oct. 10, 2024

(51) Int. Cl.
*B67D 3/00* (2006.01)
*F25D 23/12* (2006.01)

(52) U.S. Cl.
CPC ......... *B67D 3/0061* (2013.01); *B67D 3/0009* (2013.01); *B67D 3/0087* (2013.01); *F25D 23/126* (2013.01)

(58) Field of Classification Search
CPC .... B67D 3/009; B67D 3/0087; B67D 3/0061; F25D 23/126
See application file for complete search history.

(56) References Cited

U.S. PATENT DOCUMENTS

| | | | | |
|---|---|---|---|---|
| 5,560,393 | A | 10/1996 | Clack | |
| 6,574,984 | B1 | 6/2003 | McCrea et al. | |
| 8,377,292 | B2 | 2/2013 | Patera et al. | |
| 10,077,183 | B2 | 9/2018 | McMahan et al. | |
| 10,955,187 | B2 | 3/2021 | Scalf | |
| 2005/0178273 | A1* | 8/2005 | Meuleners ........... | B67D 1/0858 99/279 |
| 2005/0268639 | A1* | 12/2005 | Hortin .................. | B67D 1/0009 62/389 |
| 2013/0146179 | A1* | 6/2013 | McMahan ............ | B67D 1/1238 141/369 |
| 2015/0197417 | A1 | 7/2015 | Stagg et al. | |
| 2020/0276527 | A1* | 9/2020 | Macoretta .......... | B01D 35/1573 |

* cited by examiner

*Primary Examiner* — Jason K Niesz
(74) *Attorney, Agent, or Firm* — Dority & Manning, P.A.

(57) ABSTRACT

A pitcher with an alternate dispensing feature for use in an autofill pitcher system in a chamber of a refrigerator appliance is provided. The pitcher defines a height direction, a width direction, and a depth direction. The pitcher comprises a pitcher wall connected to a pitcher bottom defining a pitcher volume. The pitcher further comprises a spigot defining an axis, with the spigot disposed on the pitcher wall such that the axis is generally parallel to the width direction.

15 Claims, 6 Drawing Sheets

AUTOFILL PITCHER WITH ALTERNATE DISPENSING FEATURE

FIELD OF THE INVENTION

The present subject matter relates generally to refrigerator appliances, and more particularly to autofill water dispensing systems for refrigerator appliances.

BACKGROUND OF THE INVENTION

Some refrigerator appliances include autofill dispensing systems. Autofill dispensing systems typically include a dispenser housing and a pitcher. When the pitcher is positioned in a designated spot, e.g., within the autofill housing, water is automatically dispensed into the pitcher to a predetermined volume. When chilled water is desired, the pitcher is removed from the refrigerator appliance and the desired amount of liquid is manually dispensed, typically by tilting the pitcher to pour the water from the pitcher. When the pitcher is returned to the dispenser housing, it is automatically refilled to the predetermined volume of water.

In some cases, it may be desirable to dispense chilled water from the pitcher without removing the pitcher from the dispenser housing. For example, a filled pitcher may be too heavy for a user to manipulate safely. In such cases, it may be a benefit to the user to be able to dispense water directly from the pitcher without having to remove, carry, pour, or re-fill the pitcher.

Accordingly, an autofill pitcher system with a dispensing housing that addresses one or more of the challenges noted above would be desirable.

BRIEF DESCRIPTION OF THE INVENTION

Aspects and advantages of the invention will be set forth in part in the following description, may be apparent from the description, or may be learned through practice of the invention.

In one exemplary aspect, a pitcher for use in an autofill pitcher system within a chamber of a refrigerator appliance is provided. The pitcher defines a height direction, a width direction, and a depth direction. The pitcher comprises a pitcher wall connected to a pitcher bottom defining a pitcher volume, the pitcher wall defining an opening at a top edge of the pitcher, and a spigot defining an axis. The spigot is disposed on the pitcher wall such that the axis is generally parallel to the width direction.

In another example aspect, a refrigerator appliance including an autofill pitcher system and a pitcher is provided. The refrigerator appliance defines a vertical direction, a lateral direction, and a transverse direction and comprises a cabinet having a left side and a right side at least partially defining a fresh food chamber. The refrigerator appliance comprises a door rotatably hinged to an edge of the cabinet at one of the left side and the right side. The door is rotatable between an open position to provide access to the fresh food chamber and a closed position to at least partially seal the fresh food chamber. The autofill pitcher system comprises a pitcher having a pitcher wall connected to a pitcher bottom defining a pitcher volume, the pitcher wall defining an opening at a top edge of the pitcher, and a spigot defining an axis. The autofill pitcher system further comprises a dispenser defining a cavity to receive the pitcher. The spigot is disposed on a portion of the pitcher wall such that the axis is generally parallel to the transverse direction at least when the door is closed.

In yet another example aspect, an autofill pitcher system is disclosed. The autofill pitcher system includes a dispenser defining a cavity to receive a pitcher, the dispenser comprising a fill tube adapted to direct water from a water supply to the pitcher. The pitcher defines a height direction, a width direction, and a depth direction and comprises a pitcher wall connected to a pitcher bottom defining a pitcher volume, the pitcher wall defining an opening at a top edge of the pitcher. The pitcher further comprises a spigot in fluid communication with the pitcher volume, the spigot defining an axis, the spigot disposed on a portion of the pitcher wall such that the axis is generally parallel with the width direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
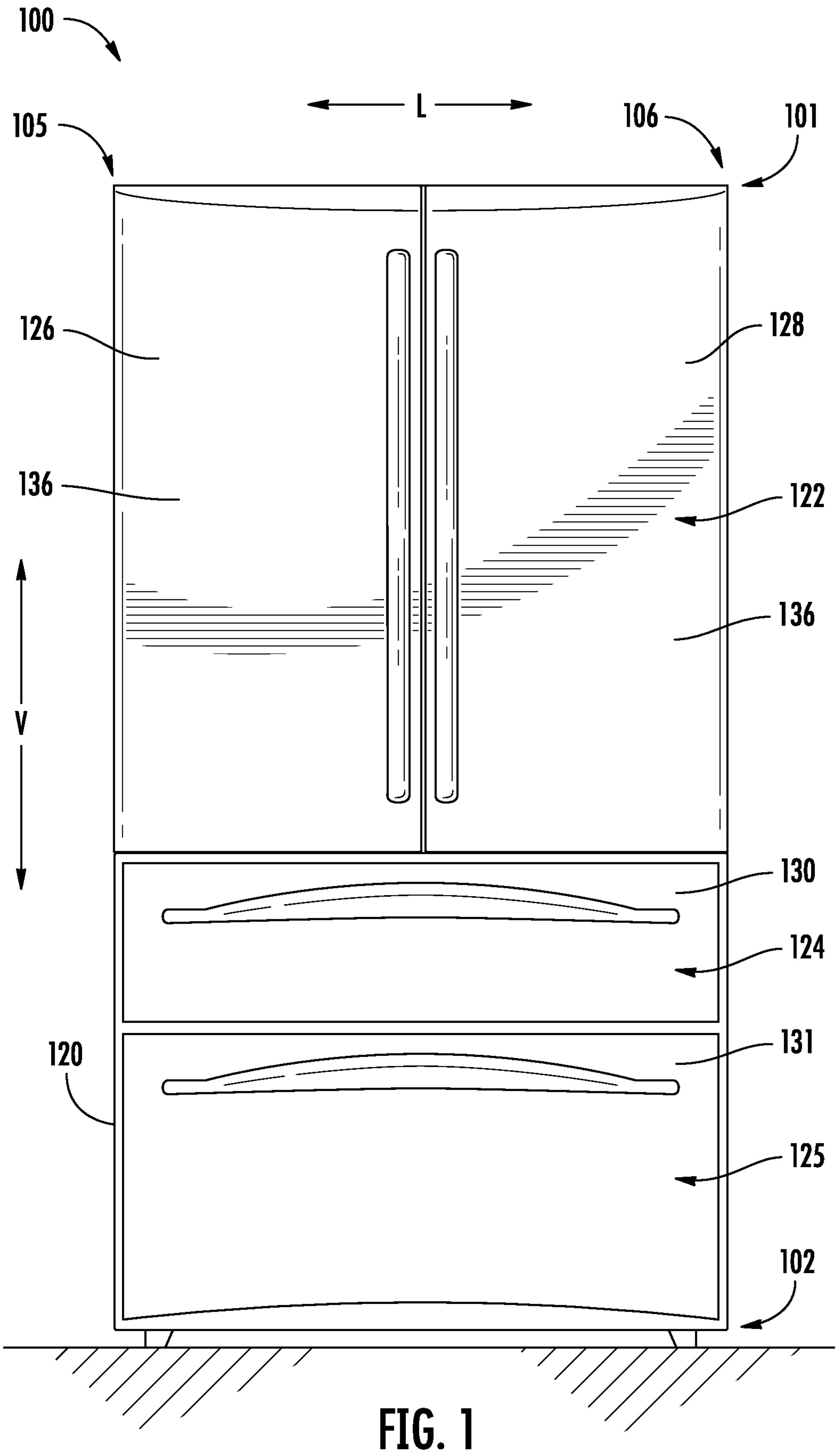
FIG. 1 provides a front view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides a front view of an exemplary refrigerator appliance 100 according to an exemplary embodiment of the present disclosure. Refrigerator appliance 100 extends between a top 101 and a bottom 102 along a vertical direction V, between a left side 105 and a right side 106 along a lateral direction L, and extends between a front and a back along a transverse direction T, which is a direction orthogonal to the vertical direction V and the lateral direction L. Vertical direction V, lateral direction L, and transverse direction T are mutually perpendicular and form an orthogonal direction system for the refrigerator appliance 100.

Refrigerator appliance 100 includes a housing or cabinet 120 defining a chilled chamber, fresh food chamber 122, and one or more freezer chambers, such as a first freezer chamber 124 and a second freezer chamber 125, which may both be arranged below fresh food chamber 122 along the vertical direction V. As illustrated, fresh food chamber 122 is bounded by vertical walls at the left side 105 and at the right side 106, such walls spaced apart in the lateral direction, a horizontal wall at the top 101 and at the bottom by a lower wall 132. In this configuration, refrigerator appliance 100 may generally be referred to as a bottom mount, or bottom freezer, refrigerator. Cabinet 120 also defines a mechanical compartment (not shown) for receipt of a sealed cooling system (not shown).

Figure 2:
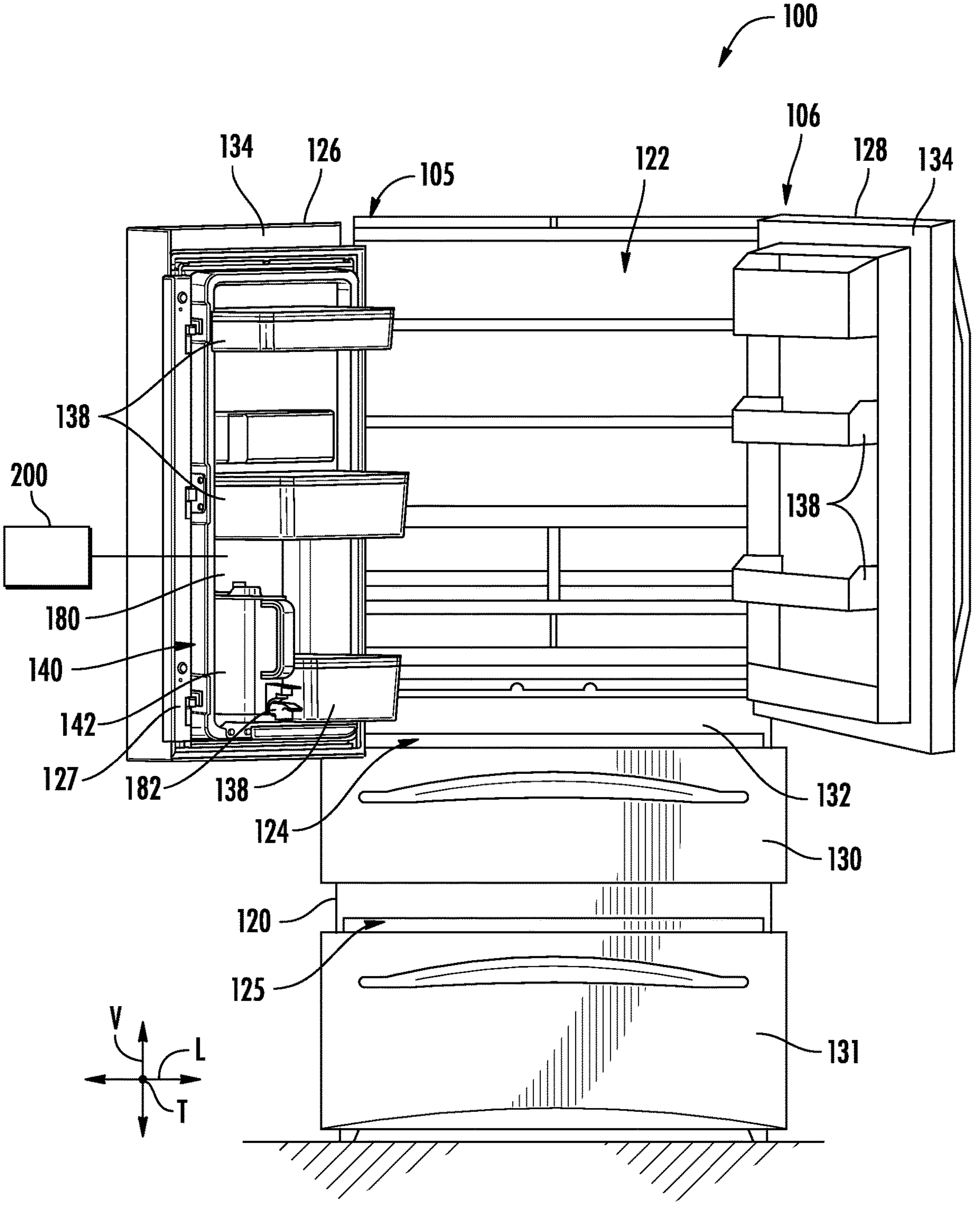
FIG. 2 provides a front view of the refrigerator appliance of FIG. 1 with refrigerator and freezer compartment doors shown in an open configuration.

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges (not shown) may couple each door 126, 128 to cabinet 120. When left and right doors 126, 128 are configured as illustrated in FIGS. 1 and 2, the door arrangement is sometimes referred to as a "French door" configuration. In other embodiments, one door may be used, rotatably hinged to one edge of cabinet 120 at one side (i.e., 105 or 106) for selectively opening or sealing fresh food chamber 122. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably coupled within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

FIG. 2 provides a front perspective view of refrigerator appliance 100 showing refrigerator doors 126, 128 in an open position to reveal the interior of fresh food chamber 122. Additionally, freezer doors 130, 131 are shown in partially open positions to reveal a portion of the interior of freezer chambers 124, 125, respectively.

Left door 126 of refrigerator appliance 100 includes an inner surface 134 and an outer surface 136 (FIG. 1). Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position. The same construction may result in a similarly formed right door 128 as left door 126 with inner surface 134 and outer surface 136. Moreover, it will further be appreciated that freezer doors 130, 131 can likewise include inner and outer surfaces 134 and 136.

Doors 126, 128 may include storage bins or shelves 138 movably or fixedly attached to the inner surface 134 of the doors 126, 128. In the embodiment illustrated in FIG. 2, left door 126 includes an autofill pitcher system 140 in accordance with this disclosure. The autofill pitcher system 140 is illustrated as a component of, or mounted to, the left door 126 for convenience. In other embodiments, the autofill pitcher system 140 may be mounted in a different position on the left door 126, or on the right door 128, or may be mounted elsewhere within the fresh food chamber 122. Autofill pitcher system 140 may be enclosed within the fresh food chamber when at least one of the doors 126, 128 is in the closed position of FIG. 1. In embodiments in which the autofill pitcher system 140 is on one of the doors (126 as illustrated or 128), when the door is closed (FIG. 1) the door 126 or 128 and the autofill pitcher system 140 cooperate to seal the chamber 122 with the autofill pitcher system 140 enclosed therein. In embodiments in which the autofill pitcher system 140 is within the fresh food chamber 122, the closed doors 126, 128 enclose the autofill pitcher system 140 inside the chamber as well.

Figure 3:
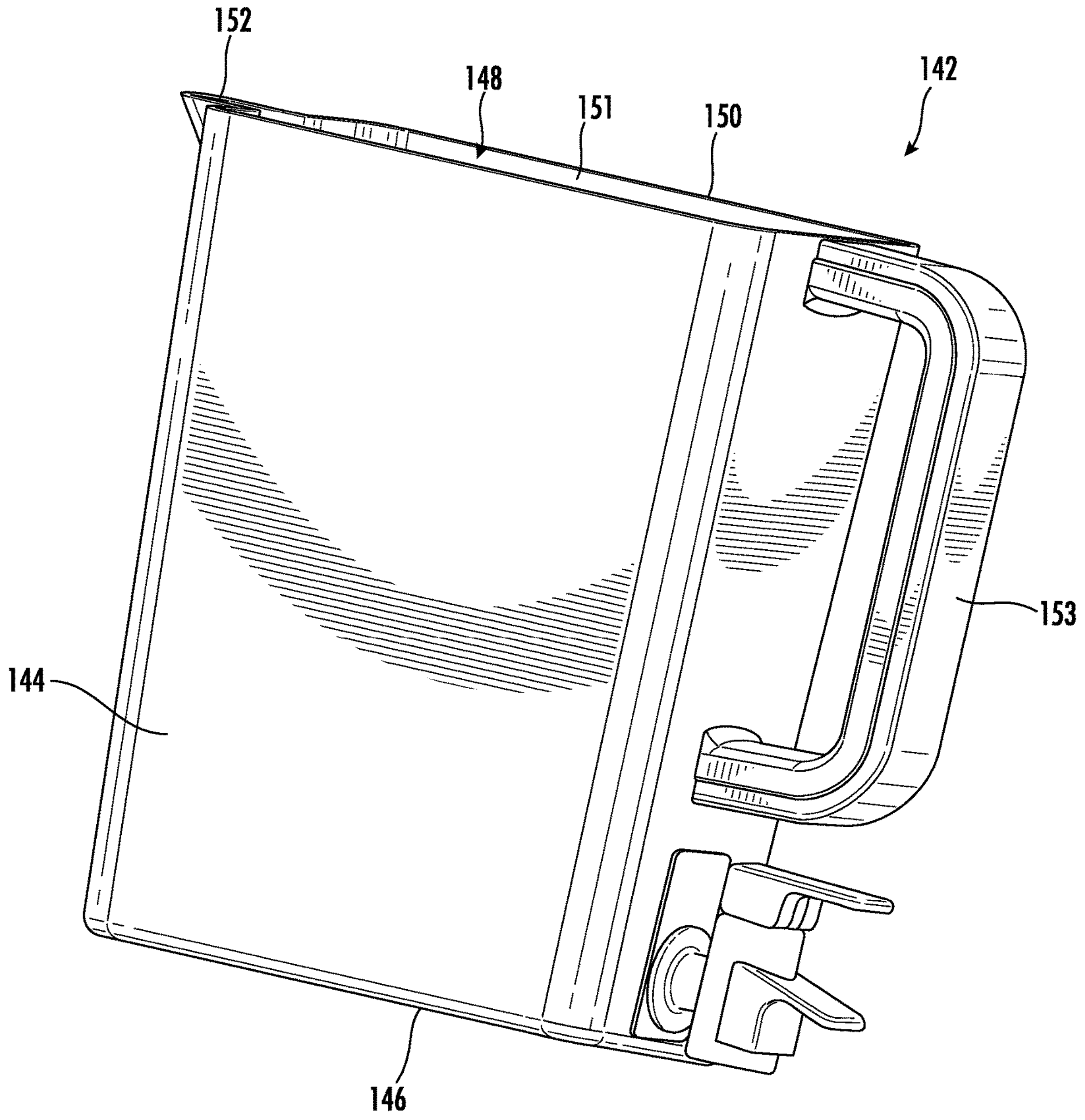
FIG. 3 provides a perspective view of a pitcher in accordance with an embodiment of the present disclosure.

The autofill pitcher system 140 comprises a removable pitcher, pitcher 142, a dispenser 160, and controller 200. The details of exemplary pitcher 142 may best be illustrated with reference to FIGS. 3 and 4. FIG. 3 is a perspective view of a representative pitcher 142 comprising a pitcher wall 144 connected to, or formed with, pitcher bottom 146. A top edge 150 is formed by the pitcher wall 144 at the pitcher end opposite pitcher bottom 146. The pitcher wall 144 and pitcher bottom 146 define a pitcher volume, volume 148, accessible through opening 151 defined by the top edge 150. For convenience, top edge 150 may also define a spout 152 at a first end of the pitcher to facilitate directing liquid into, or out of, the pitcher 142.

At a second end of the pitcher, opposite the spout 152, a handle 153 may be disposed or formed on pitcher wall 144 to provide a gripping area to aid in manipulating the pitcher 142. Pitcher 142 may include a tap or spigot 182 (disclosed more fully below) disposed on a portion of the pitcher wall 144 and in selectable fluid communication with volume 148. That is, the spigot 182 may be manually selectable between a position that allows fluid communication or blocks fluid communication with the pitcher volume 148. As illustrated, spigot 182 is beneath the handle 153 and provided to dispense a liquid, typically chilled water, from the pitcher volume 148. In other embodiments, the spigot 182 may be located or disposed on other portions of the pitcher wall 144.

Exemplary pitcher 142 is illustrated as a generally hollow rectangular cuboid for ease of illustration only. Other embodiments may have other shapes, for example a hollow cylinder, and may or may not have features such as a spout or a handle.

Figure 4:
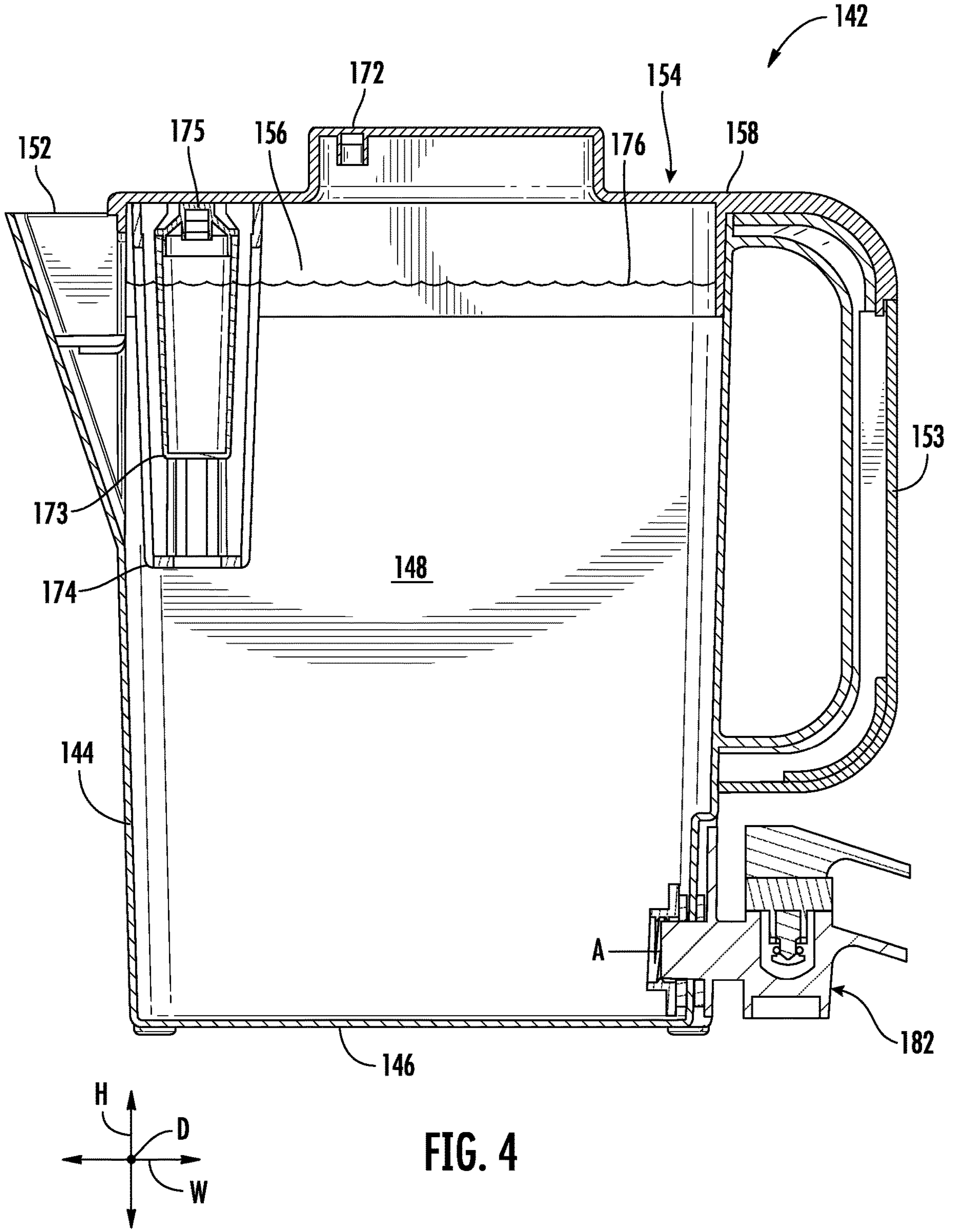
FIG. 4 provides a side sectional view of a pitcher and lid in accordance with an embodiment of the present disclosure.

An orthogonal coordinate system for the embodiment of water pitcher 142 is defined in FIG. 4. The height H is generally parallel to the vertical direction V used in reference to the refrigerator appliance 100 in FIGS. 1 and 2. Width W extends perpendicular to the height H from the spout end to the handle end of the pitcher 142. The depth D is perpendicular to the H—W plane.

As illustrated in FIG. 4, embodiments of pitcher 142 may include a lid 154 removably received in the opening 151 at the top edge 150. The lid 154 may include a peripheral skirt 156 configured to be removably received in the opening 151 of pitcher 142. Some embodiments of the skirt 156 may include features (not shown) that engage an inner portion of pitcher wall 144 at the top edge 150 to secure the lid against accidental separation from the pitcher 142.

Lid 154 includes first magnet 172 adjacent to the top wall 158 of lid 154. First magnet 172 may communicate with components of the dispenser 160 to indicate that the pitcher 142 is properly located in the dispenser 160. The lid 154 may also include a pitcher full sensor to communicate to the dispenser 160 that the volume 148 is filled to a predetermined level. In the exemplary embodiment of the FIG. 4, a float body 173 is constrained within channel 174 for vertical displacement (in the H direction) proportionally with the level of fluid in the pitcher 142. As illustrated in FIG. 4, float body 173 includes second magnet 175 at the vertically upper end of the float body 173. When the water level 176 in the pitcher 142 corresponds with a predetermined full level (as in FIG. 4), second magnet 175 is proximate to the top wall 158 and may communicate with components of the dispenser 160 to indicate that the pitcher 142 is in a full condition.

Figure 5:
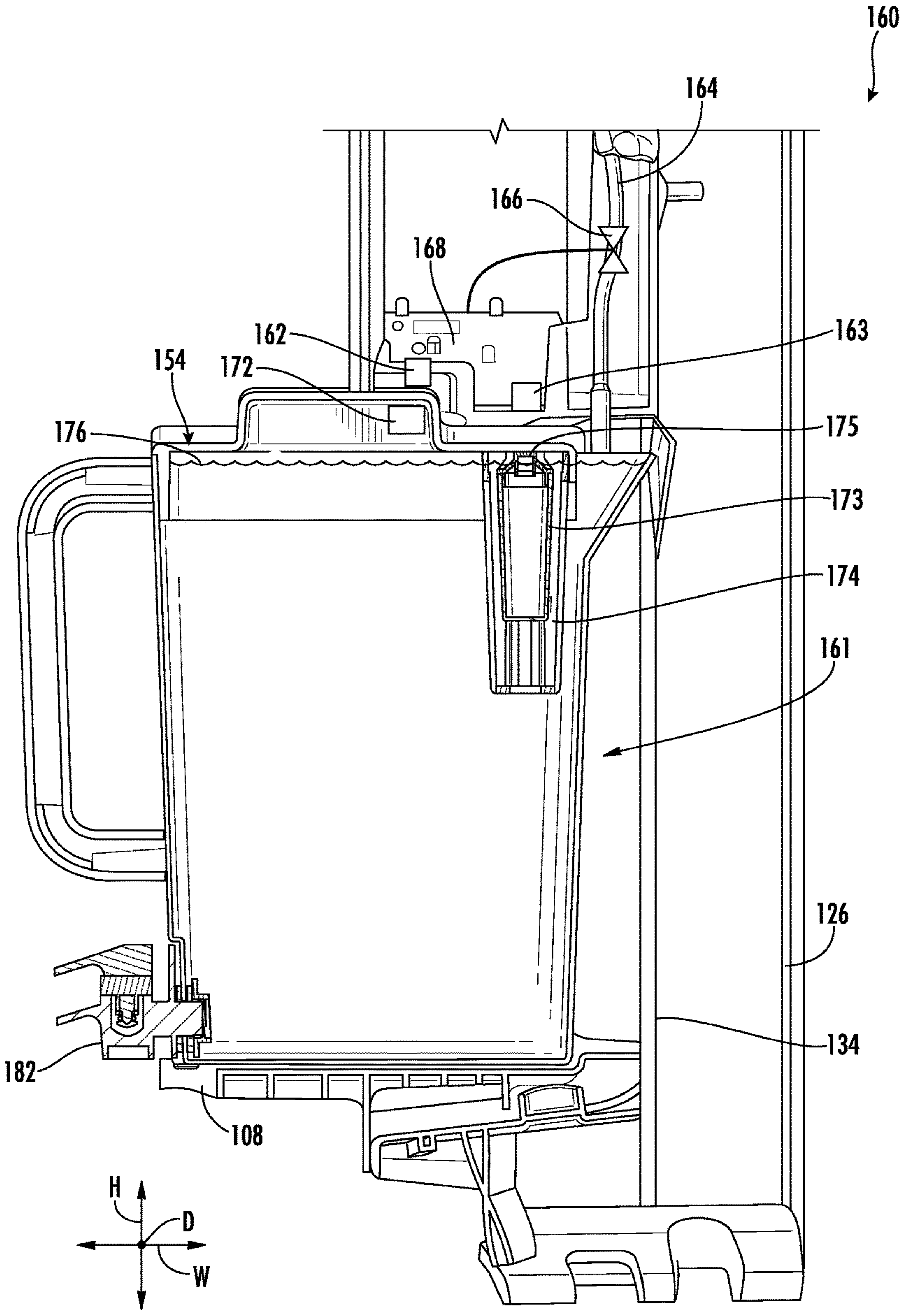
FIG. 5 provides an illustrative view of a pitcher received in a dispenser cavity in accordance with an embodiment of the present disclosure.

FIG. 5 is illustrative of a dispenser 160 that may be used with pitcher 142 in an autofill pitcher system 140. Dispenser 160 defines a cavity 161 to receive pitcher 142 with the H direction generally parallel to the vertical direction V of the refrigerator appliance 100. In the illustrative embodiment shown in the figures, dispenser 160 is positioned on the inner surface 134 of left door 126 of the refrigerator appliance 100. Other embodiments may have the dispenser 160 on door 128 or elsewhere in the fresh food chamber 122.

As illustrated at least in FIG. 5, the cavity 161 comprises a support shelf 108 in direct contact with pitcher bottom 146 to support the pitcher 142 in the vertical direction V. When the pitcher 142 is received in the cavity 161 as illustrated in FIG. 5, a portion of the pitcher wall 144 is adjacent to inner surface 134 of door 126. Inner surface 134 makes inaccessible the portion of the pitcher wall 144 that is adjacent to it. As illustrated in, for example, FIGS. 2 and 5, the remaining portions of pitcher wall 144 are exposed when the pitcher 142 is received in the cavity 161. As used herein, walls are exposed when they are readily accessible to a user without moving the pitcher 142. Accessibility may require one or both doors 126, 128 to be in an open position.

Sensor board 168 is vertically above and adjacent to the lid 154 as shown in FIG. 5 when the pitcher 142 is received in dispenser 160. The dispenser 160 may also include a fill tube 164 to direct water from a water supply to pitcher 142 and a valve 166 to selectively control the flow. Components of the dispenser 160 may be in functional communication with controller 200. As such, controller 200 may control the operation of the dispenser 160.

The sensor board 168 includes a first sensor 162 secured to the board to detect the first magnet 172 when the pitcher 142 is properly located in the dispenser 160 to accept a flow of water. The sensor board 168 also includes second sensor 163 positioned such that it is vertically above float body 173 when the pitcher is in the dispenser 160. When the pitcher 142 is in a filled condition as illustrated in FIG. 5, second magnet is proximate to second sensor 163 and may communicate with the second sensor 163, indicating the pitcher 142 is in a filled condition and cannot accept a flow of water.

Figure 6:
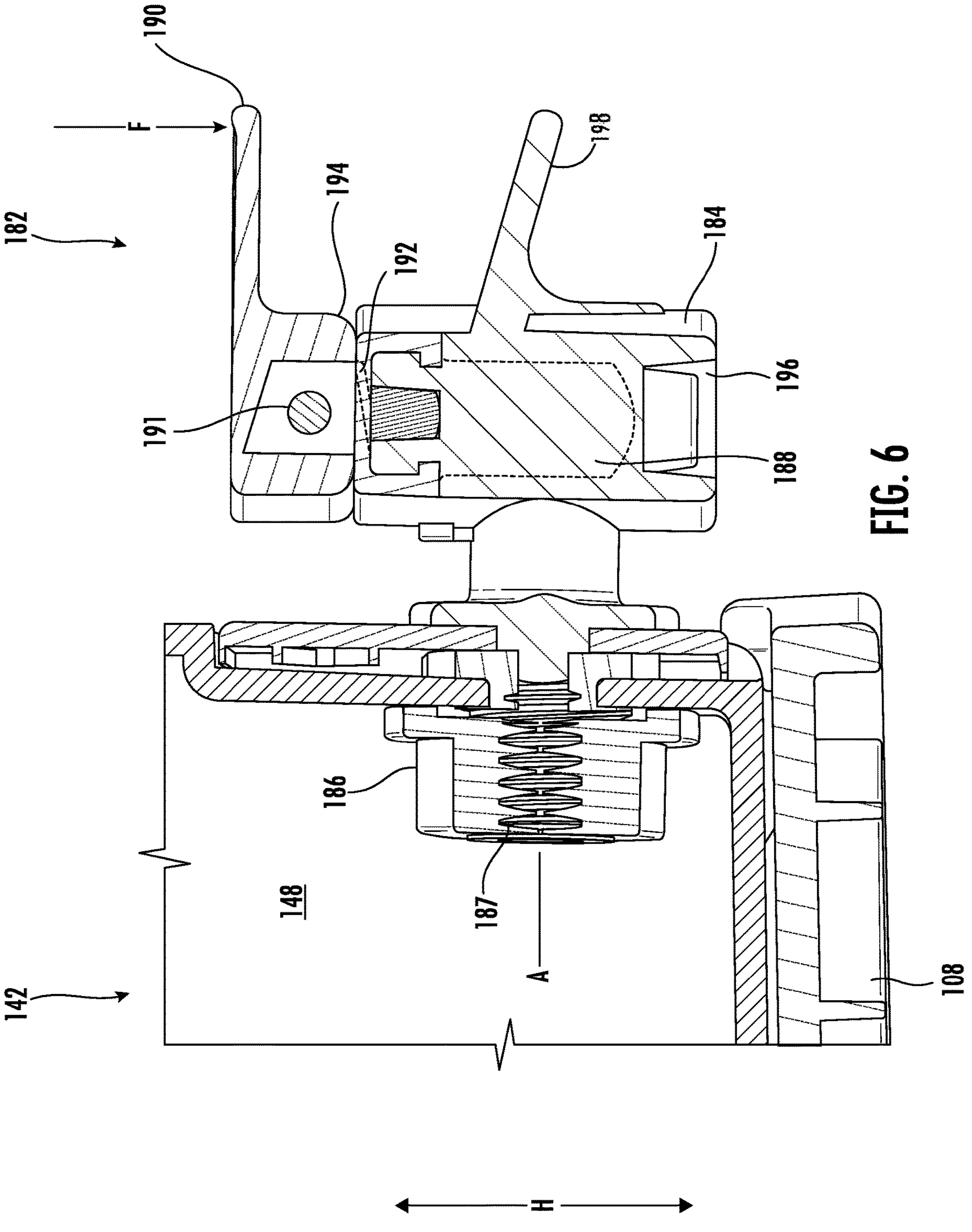
FIG. 6 represents a spigot in accordance with an embodiment of the present disclosure.

As illustrated in FIG. 6 and disclosed above, pitcher 142 includes a spigot 182 positioned on the pitcher wall 144 and penetrating the pitcher wall 144 to selectively establish or block fluid communication with the pitcher volume 148. Specifically, spigot 182 may manually selectively allow or block (prevent) fluid communication between the pitcher volume 148 and opening 196 of the spigot 182. In instances where the pitcher volume 148 contains an amount of water (or other liquid), the spigot 182 may manually selectively allow or prevent a flow of water (or other liquid) from the pitcher volume 148 through the spigot 182 and spigot opening 196. In some embodiments, spigot 182 is opposite to the spout 152. Spigot 182 is also located vertically (in the H direction) below the handle 153. Specifically, spigot 182 may be disposed on the pitcher wall 144 adjacent to, or substantially adjacent to, the pitcher bottom 146. When located at a vertically (corresponding with a lower position in the H direction) lower portion of the wall 144, spigot 182 is positioned to have access to, and drain, all, or substantially all, of the liquid in volume 148 of pitcher 142. Positioned at a lower (in the H direction) portion of the pitcher 142, spigot 182 may be in an area of higher pressure from the height of water vertically (in the H direction) above the spigot. This elevated pressure may encourage the flow of liquid from the pitcher 142 through the spigot 182.

As may be seen for example in FIG. 5, when the pitcher 142 is properly placed within the dispenser 160, spigot 182 is not obstructed and is easily accessible to a user. In the embodiment of FIG. 2, when door 126 is in the open position as illustrated, spigot 182 is freely accessible to dispense water from the pitcher 142.

In the embodiments illustrated in at least FIGS. 3, 4, and 5, spigot 182 does not interfere with the handle 153 or with a user's access to handle 153. Spigot 182 is also clear of the bottom surface of pitcher bottom 146, meaning that no part of the spigot 182 extends vertically lower than bottom 146. Thus pitcher 142 can be supported at or on pitcher bottom 146 without interference from the spigot 182.

As illustrated in at least FIGS. 1 and 5, when pitcher 142 is received in cavity 161, pitcher wall 144 is in close proximity to other structures of the dispenser 160 or portions of door 126 on at least three sides. For example, inner surface 134 of left door 126 is in close proximity to the spout 152 side of the pitcher 142, making access to that portion of pitcher wall 144 inaccessible. As illustrated in FIG. 2, shelf 138 is abutting at least a lower portion of pitcher wall 144 along the width direction W (FIG. 4). Similarly, the opposite portion of wall 144 abuts a portion of the edge 127 of door 126. Accordingly, in the illustrated embodiment, spigot 182 may be preferably positioned at a lower portion of wall 144 such that axis A (FIG. 6) of the spigot is generally perpendicular to inner surface 134 of door 126. Accordingly, at least when the door 126 is in a closed position (FIG. 1), axis A is generally parallel to transverse direction T of refrigerator appliance 100.

Alternatively, if pitcher 142 was received in dispenser 160 such that depth direction D was generally perpendicular to the inner surface 134 of door 126, it may be preferable to position the spigot on a portion of wall 144 such that axis A is perpendicular to inner surface 134 of door 126. Accordingly, at least when door 126 is in a closed position (FIG. 1), axis A is generally parallel to transverse direction T of refrigerator appliance 100.

In other embodiments, the dispenser 160 is positioned within the cabinet 120, for example in fresh food chamber 122, to receive pitcher 142 in cavity 161. For accessibility and in order to dispense fluid from pitcher 142 without removing the pitcher form the cabinet, spigot 182 may be positioned on wall 144 such that axis A is generally parallel to the transverse direction T of refrigerator appliance 100.

Spigot 182 may be any type of tap or stopper to manually allow or prevent the flow of liquid from the pitcher volume 148 of pitcher 142. FIG. 6 represents an illustrative spigot 182 in accordance with embodiments of the present disclosure. Spigot 182 includes a body 184 fluidly coupled to the pitcher volume 148 of pitcher 142. In embodiments, the spigot 182 is removably fluidly coupled to the pitcher wall 144. In the illustrated embodiment, body 184 is mechanically fluidly coupled to the pitcher 142 with a threaded connection 186, for example a bulkhead fitting, that sealingly engages with a portion of the body 184, for example an externally threaded portion 187. Appropriate seals and gaskets (not shown) may be provided to facilitate the creation of a water-tight seal between the spigot 182 and the pitcher 142. Other attachment methods may be used to secure the body 184 to the pitcher 142. For example, body 184 may be chemically or thermally bonded to the pitcher 142 to achieve a water-tight seal.

A plunger 188 may slidingly engage with the body 184 and supported for limited displacement in the H direction. Displacement of plunger 188 in the H direction may be constrained by components of the body 184. Both plunger 188 and the engaging portion of body 184 may have matching tapers to facilitate sealing as illustrated. An upper portion of plunger 188 may be pivotally engaged with lever 190 at pivot 191. Resilient member, spring 192, is contained between lever 190 and plunger 188, biasing the plunger in the downward direction (H direction), sealing the body 184 from pitcher volume 148. A downward force F on lever 190 causes the lever 190 to rotate about fulcrum 194 displacing plunger 188 vertically upward (in the H direction). The vertical displacement moves plunger 188 and body 184 from a sealing engagement and allows contents of the pitcher volume 184 to flow into the body 184 and out through opening 196.

Spigot body 184 may include a projection 198 extending from body 184 vertically below lever 190. Projection 198 may provide a user with a resisting surface when applying downward force F on the lever 190. For example, a user's index finger and thumb may be used to activate the spigot 182. In doing so, the user's index finger may engage the projection 198 and the user's thumb engage the lever 190 to apply force F.

The above description of the spigot 182 is merely illustrative and not limiting. Any other form of spigot or tap may be used, for example a spigot may be rotationally displaced to selectively allow or prevent the flow of liquid from the pitcher 142. As explained herein, aspects of the present subject matter are generally directed to an autofill pitcher of a refrigerator where the autofill pitcher includes a spigot to dispense water. For example, the autofill pitcher includes a water filling/dispensing spout at the top, and the spigot at the bottom to dispense water without removing the pitcher from the refrigerator. This feature provides a cleaner look than the method of dispensing water by removing the pitcher and pouring the contents, and gives alternate options to the customers for getting chilled filtered water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pitcher for use in an autofill pitcher system in a chamber of a refrigerator appliance, the pitcher defining a height direction, a width direction, and a depth direction, the pitcher comprising:

- a pitcher wall connected to a pitcher bottom defining a pitcher volume, the pitcher wall defining an opening at a top edge of the pitcher;
- a lid received within the opening at the top edge of the pitcher; and
- a spigot defining an axis; and
- wherein:
  - the top edge of the pitcher defines a spout by which liquid is directed into and out of the pitcher volume while the lid is received within the opening at the top edge of the pitcher; and
  - the spigot is disposed on a portion of the pitcher wall opposite the spout and such that the axis is generally parallel to the width direction.

2. The pitcher of claim 1, wherein the spigot penetrates the pitcher wall to establish fluid communication with the pitcher volume.

3. The pitcher of claim 1, further comprising a handle disposed on a portion of the pitcher wall opposite the spout.

4. The pitcher of claim 1, wherein the spigot manually allows or prevents fluid communication with the pitcher volume.

5. A refrigerator appliance including an autofill pitcher system and a pitcher, the pitcher defining a height direction, a width direction, and a depth direction and the refrigerator appliance defining a vertical direction, a lateral direction, and a transverse direction, the refrigerator appliance comprising:

a cabinet comprising a left side and a right side at least partially defining a fresh food chamber;

a door rotatably hinged to an edge of the cabinet at one of the left side and the right side and rotatable between an open position to provide access to the fresh food chamber and a closed position to at least partially seal the fresh food chamber; and the autofill pitcher system comprising:

the pitcher comprising:

a pitcher wall connected to a pitcher bottom defining a pitcher volume, the pitcher wall defining an opening at a top edge of the pitcher;

a lid received within the opening at the top edge of the pitcher; and a spigot defining an axis;

a dispenser defining a cavity to receive the pitcher; and wherein:

the top edge of the pitcher defines a spout by which liquid is directed into and out of the pitcher volume while the lid is received within the opening at the top edge of the pitcher; and the spigot is disposed on a portion of the pitcher wall opposite the spout and such that the axis is generally parallel to the width direction.

6. The refrigerator appliance of claim 5, wherein the autofill pitcher system is enclosed within the fresh food chamber when the door is in the closed position.

7. The refrigerator appliance of claim 6, wherein the autofill pitcher system is mounted to an inside surface of the door.

8. The refrigerator appliance of claim 5, further comprising a handle disposed on a portion of the pitcher wall opposite the spout.

9. The refrigerator appliance of claim 5, wherein the dispenser comprises a fill tube adapted to direct water to the spout.

10. The refrigerator appliance of claim 5, wherein the spigot manually allows or prevents fluid communication with the pitcher volume.

11. The refrigerator appliance of claim 5, wherein the pitcher is removably received in the dispenser.

12. An autofill pitcher system, comprising:

a dispenser defining a cavity to receive a pitcher, the dispenser comprising a fill tube adapted to direct water from a water supply to the pitcher;

the pitcher defining a height direction, a width direction, and a depth direction, the pitcher comprising:

a pitcher wall connected to a pitcher bottom defining a pitcher volume, the pitcher wall defining an opening at a top edge of the pitcher;

a lid received within the opening at the top edge of the pitcher; and a spigot in fluid communication with the pitcher volume, the spigot defining an axis; and wherein:

the top edge of the pitcher defines a spout by which liquid is directed into and out of the pitcher volume while the lid is received within the opening at the top edge of the pitcher; and the spigot is disposed on a portion of the pitcher wall opposite the spout and such that the axis is generally parallel with the width direction.

13. The autofill pitcher system of claim 12, wherein the spigot is disposed on a portion of the pitcher wall and penetrates the pitcher wall to establish fluid communication with the pitcher volume.

14. The autofill pitcher system of claim 12, wherein the fill tube directs water to the spout.

15. The autofill pitcher system of claim 12, wherein the pitcher is removably received in the dispenser.

* * * * *